US012586115B2

(12) United States Patent
Xu

(10) Patent No.: US 12,586,115 B2
(45) Date of Patent: Mar. 24, 2026

(54) FACET-BASED CONTEXT-AWARE USER INTERFACES

(71) Applicant: Amazon Technologies, Inc., Seattle, WA (US)

(72) Inventor: Peng Xu, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 826 days.

(21) Appl. No.: 17/697,617

(22) Filed: Mar. 17, 2022

(65) Prior Publication Data

US 2023/0316373 A1 Oct. 5, 2023

(51) Int. Cl.
| | |
|---|---|
| *G06Q 30/00* | (2023.01) |
| *G06F 16/9535* | (2019.01) |
| *G06F 16/9538* | (2019.01) |
| *G06Q 30/0601* | (2023.01) |

(52) U.S. Cl.
CPC ..... *G06Q 30/0631* (2013.01); *G06F 16/9535* (2019.01); *G06F 16/9538* (2019.01); *G06Q 30/0641* (2013.01)

(58) Field of Classification Search
CPC ............ G06Q 30/0631; G06Q 30/0641; G06F 16/9535; G06F 16/9538
See application file for complete search history.

(56) References Cited

U.S. PATENT DOCUMENTS

| | | | | |
|---|---|---|---|---|
| 2014/0207622 A1* | 7/2014 | Vijayaraghavan | ........................... | G06Q 30/0201 705/26.62 |
| 2018/0113919 A1* | 4/2018 | Datta | .................. | G06F 16/9538 |
| 2021/0110458 A1* | 4/2021 | Pande | ................ | G06Q 30/0623 |
| 2021/0182287 A1* | 6/2021 | Agarwal | ............... | G06N 20/00 |
| 2021/0398186 A1* | 12/2021 | Tang | .................. | G06Q 30/0643 |

OTHER PUBLICATIONS

B. Kanagal and S. Tata, "Recommendations for All: Solving Thousands of Recommendation Problems Daily," 2018 IEEE 34th International Conference on Data Engineering (ICDE), Paris, France, 2018, pp. 1404-1413, doi: 10.1109/ICDE.2018.00159. (Year: 2018).*
PCT, "International Search Report & Written Opinion" Application No. PCT/US2023/064285, mailed Jun. 27, 2023, 15 pages.

* cited by examiner

*Primary Examiner* — Anand Loharikar
(74) *Attorney, Agent, or Firm* — Eversheds Sutherland (US) LLP

(57) ABSTRACT

Systems, devices, and methods are provided for facet-based context-aware user interfaces. A system such as an online purchasing system may determine one or more intent contexts based at least in part on one or more user interactions with an online purchasing system associated with a first product. A list of substitute products may be determined based on the intent context and facets associated with the substitute products to provide for a diversity of dimensions along which a user can explore different products.

18 Claims, 10 Drawing Sheets

100

300

302

DETERMINE INTENT CONTEXT FROM SEARCH QUERY 310 → DETERMINE RANKED LIST OF SUBSTITUTE PRODUCTS 312 → DETERMINE RANKED LIST OF FACETS 314 → MERGE LISTS & PRESENT RESULT 316

400

402

Amazon's Choice Awards

|  | LQ Series 8 OLED558AUA 55-Inch 4K Ultra ... 55" 4K LCD 2018 ☆☆☆☆☆ 1,045 $1.139 Prime FREE delivery by Fri, May 1 | Hanse55-Inch Class H9 Quantum Series Android 4K ULED ... 55" 4K LCD 2020 ☆☆☆☆☆ 1,045 $1.199 Prime FREE delivery by Fri, May 1 Amazon's Choice |
|---|---|---|
| PRODUCT FEATURES | | |
| Brand | LQ | Hanse |
| Screen Size | 55" | 55" |
| Relese Year | 2018 | 2020 |
| Model | Series 8 | Quantum |
| Display Technology | 4K | 4K |
| PRODUCT PERFORMANCE | | |

404A
404B
404C 408A      408B      408C      408D

600A

600B

602B

608B

604B

606B

700

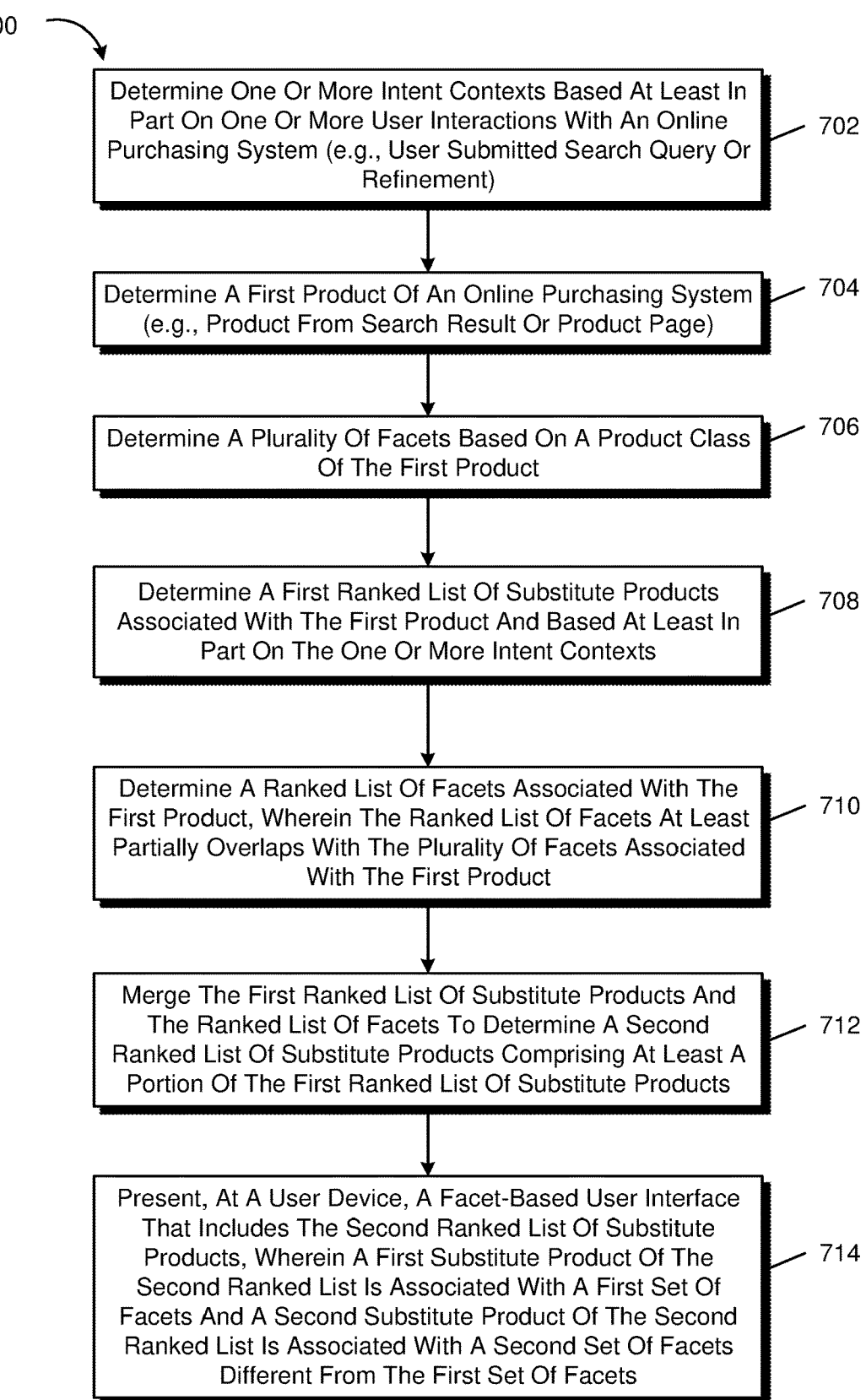

Determine One Or More Intent Contexts Based At Least In Part On One Or More User Interactions With An Online Purchasing System (e.g., User Submitted Search Query Or Refinement) — 702

Determine A First Product Of An Online Purchasing System (e.g., Product From Search Result Or Product Page) — 704

Determine A Plurality Of Facets Based On A Product Class Of The First Product — 706

Determine A First Ranked List Of Substitute Products Associated With The First Product And Based At Least In Part On The One Or More Intent Contexts — 708

Determine A Ranked List Of Facets Associated With The First Product, Wherein The Ranked List Of Facets At Least Partially Overlaps With The Plurality Of Facets Associated With The First Product — 710

Merge The First Ranked List Of Substitute Products And The Ranked List Of Facets To Determine A Second Ranked List Of Substitute Products Comprising At Least A Portion Of The First Ranked List Of Substitute Products — 712

Present, At A User Device, A Facet-Based User Interface That Includes The Second Ranked List Of Substitute Products, Wherein A First Substitute Product Of The Second Ranked List Is Associated With A First Set Of Facets And A Second Substitute Product Of The Second Ranked List Is Associated With A Second Set Of Facets Different From The First Set Of Facets — 714

FIG. 7

800

| | |
|---|---|
| 802 — HARDWARE PROCESSOR<br>824 — INSTRUCTIONS | GRAPHICS DISPLAY DEVICE — 810 |
| | INPUT DEVICE — 812 |
| 804 — MAIN MEMORY<br>824 — INSTRUCTIONS | UI NAVIGATION DEVICE — 814 |
| 806 — STATIC MEMORY<br>824 — INSTRUCTIONS | STORAGE DEVICE — 816<br>MACHINE-READABLE MEDIUM — 822<br>INSTRUCTIONS — 824 |
| 828 — SENSORS | |
| | SIGNAL GENERATION DEVICE — 818 |
| 820 — NETWORK INTERFACE | FACET-BASED INTERFACE SUBSYSTEM — 836 |
| 830 — ANTENNA(S) | POWER DEVICE — 832 |
| 808 | OUTPUT CONTROLLER — 834 |

826 — COMMUNICATIONS NETWORK

FIG. 8

FACET-BASED CONTEXT-AWARE USER INTERFACES

BACKGROUND

Customers of an online purchasing system spend large amounts of time performing research and seek out information in the buying process that lead the customer to a purchase decision. This exploration typically takes the customer across multiple brands/products. In many cases, this exploration is not a straight line down an obvious funnel but more circular in nature. While many systems have attempted to provide recommendations and assistance to customers in their purchase decision, it is often difficult to determine the best way to surface additional information to users that is helpful in the decision making process. Providing redundant or irrelevant information may be unhelpful or even harmful, as it may distract or frustrate a user in the decision making process.

BRIEF DESCRIPTION OF THE DRAWINGS

FIG. 4 illustrates an environment in which a product comparison user interface is implemented, in accordance with one or more example embodiments of the present disclosure. In various embodiments, a customer may access the product comparison user interface from a detailed product page (e.g., as depicted in FIG. 4) by selecting a substitute product to perform a comparison with.

FIG. 7 shows an illustrative example of a process for determining a facet-based context-aware user interface, in accordance with one or more example embodiments of the present disclosure.

FIG. 8 illustrates a block diagram of an example machine upon which any of one or more techniques (e.g., methods)

Figure 1:
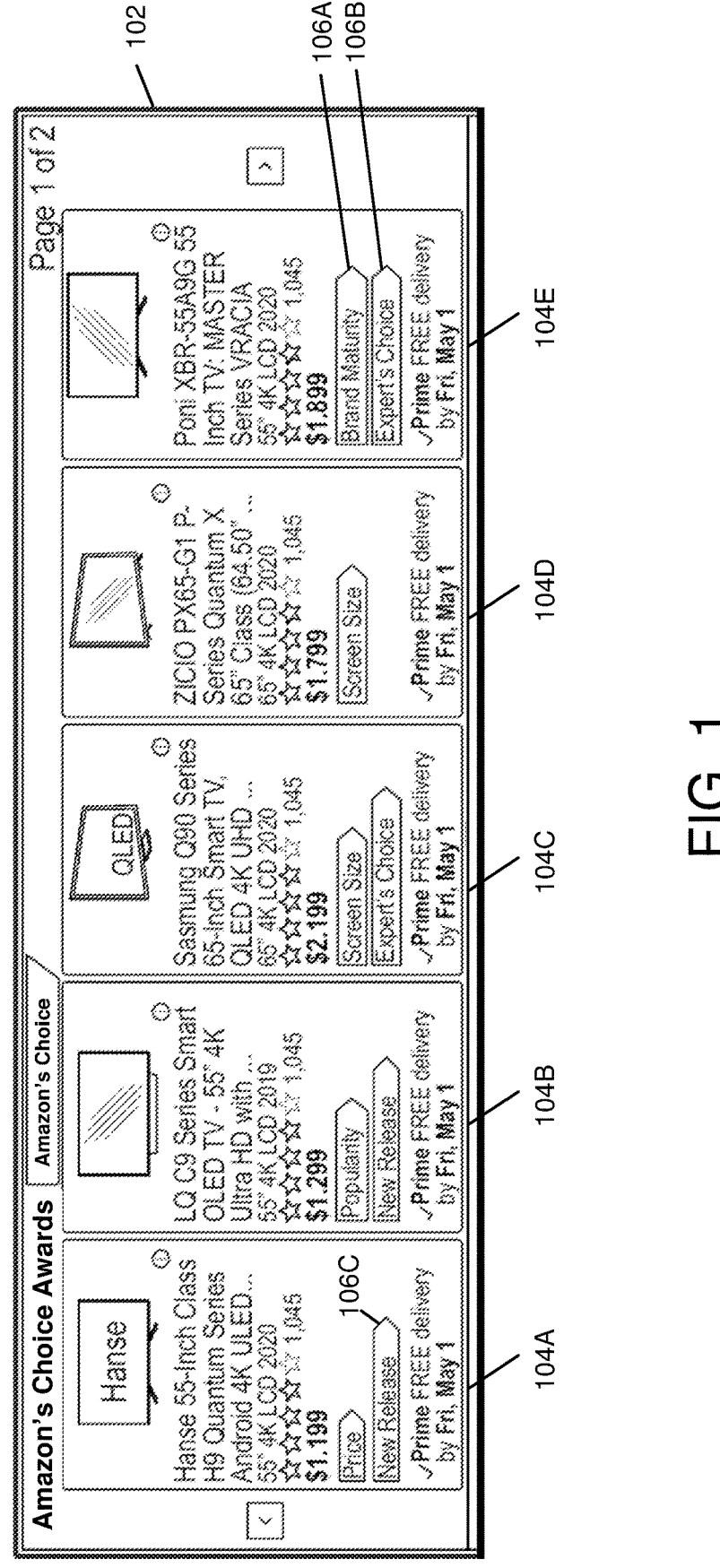
FIG. 1 illustrates an environment in which product recommendations are shown in a facet-based context-aware user interface, in accordance with one or more example embodiments of the present disclosure.

may be performed, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for facet-based context-aware user interfaces. Facet-based context-aware user interfaces may be used to create intent-based recommendations for users of an online purchasing systems and provide for more relevant recommendations to users based on the user's intent context. A user's intent context can be extracted by contextual information inferred based on how a user performs searches, navigates through search results, and so forth.

Shopping cart abandonment is one of the most critical problems for online purchasing systems. One technique for combatting abandonment is to accept that abandonment will occur for some proportion of users and to re-engage with those customers at a later point in time with a re-marketing campaign. For example, a graphical user interface with a cart or later email can be used to re-engage customer.

Facet-based context-aware user interfaces may be used to display a substitute campaign when a customer is actively interacting with a product, for example, adding or removing items from a shopping cart, or clicking on a product on a search page to open its detail page, navigating away from a product recommended through a facet-based context-aware user interface, and so forth. This allows for customers to more easily explore a diversity of products in a facet-based discovery experience and allows customers to more easily express their intent context, and also makes it easier for an online purchasing system to infer the user's intent context. Furthermore, the customer's attention to be captured at the exact moment that they plan to abandon a recommended pick. By interacting with customers at this critical moment in their shopping journey, hesitant customers can be motivated to continue exploring a recommended item and ultimately purchase it. For example, because a product in a Saved Items list or in a cart has changed price that causes the product to lose its competitive advance, a customer may remove that item. With techniques described herein, facet-based context-aware user interfaces may be used to surface alternatives that compare it to the product that match the user's intent.

Various dimensions may be incorporated into a multi-dimensional facet-based model that is used for quantifying performance and customer's satisfaction of products. Dimensions in the model can be classified into various category types. These types of categories may include factual dimension and synthetic dimension. Data of product in factual dimension is informational. Factual dimension could be product attributes in catalog (e.g., brand, color, size) or offer-level properties (e.g., shipping speed, pricing), which represents product property allowing to adjust scope of product selection and find desired one to purchase. The factual dimensions used to identify substantive differences in the generic products are various among different product taxonomy. Data of product in synthetic dimensions is qualitative and can give insight for measuring how good/bad a product is in one aspect. Suppose a customer is shopping for a high-consideration product. Data of actual dimensions tells the customer what brand each product belongs to, detail about feature spec, how much he needs to pay for purchase. Performance of product in synthetic dimensions can tell the customer if the brand is top well-known in the marketplace, if a product has serious trustability issue (e.g. design flaws) that consumers are often completely unaware of but be identified by experts.

Algorithms implemented herein may include a product-to-product (P2P) relevance algorithm. AC smart may be built with a P2P algorithm to ensure the relevance between recommendations picked and the landing product. Product relevance may be calculated from dimension correlation. For example, given two products A and B, a system may determine if they belong to the same product type, and then identify available dimensions—including both facet-based dimensions and variable-based dimensions. The algorithm may then compute correlation of the set of dimension vectors from product A and B, denoted as Va, and Vb, as the similarity measure between those two products. The correlation may be calculated as follows:

$$\text{Corr}(Va,\ Vb) = \sqrt{\frac{[Va]\cdot[Vb]}{[Va]\cdot[Va]*[Vb]\cdot[Vb]}}$$

Substitute ranking algorithms may be discussed in greater detail below, and multiple approaches can be used. By combining multiple strategies, the final result may be better both in terms of coverage and in relevancy. This may be implemented by a ranking service of an online purchasing system. Given a set of candidate products (e.g., based on both factual and synthetic dimensions), the ranking service returns a list of candidate products ordered by relevancy.

Examples of graphical interfaces that implement facet-based context-aware user interfaces (e.g., widgets) are described in greater detail below, for example, in connection with FIGS. 1-8. A smart widget may refer to an illustrative, non-limiting example of a facet-based graphic interface element that provides enhanced user interaction for productive discoverability. Products shown in a facet-based smart widget may include tags or otherwise surface synthetic dimensions regarding the products being shown. For example, and as depicted in FIG. 1, the products shown in a facet-based smart widget may include two or more tags. The tags may be synthetic dimensions, factual dimensions, or a combination thereof. Facets may be strategically selected across multiple products that are to be displayed in a facet-based context-aware user interface to provide the user with a diversity of facets. At a glance, a user may see a large number of facets-up to N*M wherein N refers to the number of product cards and M refers to the number of facets that may be shown per product card. This number may far exceed the number of filters that can be practically shown in other types of search experiences. M may be 2, 3, 4, or even more, in various embodiments, which may depend on content density, display size, and other factors, and different facets may be shown on each product card to provide customers with more flexibility in how they can express their purchasing intent. Customers can leverage individual tags and combinations of tags to quickly and easily express and refine their purchasing intent, find products that are of interest to them, and make better purchasing decisions.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an environment 100 in which a facet-based context-aware user interface 102 is implemented, in accordance with one or more example embodiments of the present disclosure.

In various embodiments, facet-based context-aware user interface 102 is a carousel of substitute products that may be displayed in a product page of an online purchasing system. Various types of facet-based context-aware user interfaces may exist, such as widgets, plugins, pop-ups, and other graphical elements that may be displayed as part of a web page, mobile application, email, or other forms of digital content.

Facet-based context-aware user interface 102 may comprise a list of products. For example, FIG. 1 depicts five product cards 104A, 104B, 104C, 104D, and 104E that may be relevant to a user's search based on intent context determined from various sources, including how the user navigated to a particular product page. The determination and ranking of products for presentation in facet-based context-aware user interface 102 is described in greater detail below, according to various embodiments. A user may navigate and interact with facet-based context-aware user interface 102 in any suitable manner. For example, the user interface may include user interaction interfaces such as buttons that can be used to navigate thru a list of products. For example, clicking a right-arrow button may navigate the facet-based context-aware user interface 102 to no longer display product card 104A and to update the user interface by shifting product card 104B left, shift product card 104C left, and so forth, and then present an additional sixth product card (not shown in FIG. 1) so that five cards remain displayed in the smart widget. Accordingly, it may be the case that the Nth, N+1th, N+2th, N+3th, and N+4th product cards may be shown in the carousel, starting with N=1, and allowing the user to scroll left or right to, for example, display the N+1th, N+2th, N+3th, N+4th, and N+5th product cards. User navigation may be iteratively performed to allow the user to scroll through and explore different product cards and see a diversity of products.

As depicted in FIG. 1, and in accordance with various embodiments, product cards may display information associated with various products. These may be products sold by an online purchasing system. The product cards may include various information about the product such as a manufacturer name, model number, brand, brand type, release year, features (e.g., 4K LCD television), reviews, overall rating, price, and so forth. In various embodiments, text-based fields of the product card may be used to convey factual facet information regarding various factual attributes of the products. For example, the product title for product cards of facet-based, context-aware user interface may be dynamically generated to produce a diversity of factual facets in the product titles. For example, the display size, display, display type, and other features of the product may be displayed to provide a diversity of factual facets. For example, a first product card may state that it has integrated smart TV capabilities, a second product card may state that it has 120

Hz refresh rate, and a third product card may state that the television supports voice controls. In this way, a user may implicitly express a purchase intent for one or more factual facets when the user clicks on a product card. In the example described above, if the user selects the second product card with 120 Hz refresh rate in the product title, then the user may navigate to the second product's details page and a facet-based context-aware user interface may provide some product recommendations with 120 Hz refresh rate. If the user continues to explore other products with 120 Hz refresh rate, the online purchasing system's confidence that this is a purchase intent may be strengthened, and subsequent recommendations may have more focus on products with this feature, or may be filtered to include only products that include the indicated feature. Various levels of detail may be presented in the product card to provide the user an overview of the product and assist a user in making a purchase decision.

Turning now to product card 104E specifically, it can be appreciated from FIG. 1 that product card 104E comprises two facets 106A and 106B. Facets 106A and 106B may refer to attributes of the product associated with product card 104E that may be surfaced in facet-based context-aware user interface 102. Facets may be ranked based on customer shopping behavior analysis, and may be combined together based on facet dependency. In various embodiments, products shown in facet-based context-aware user interface 102 are ranked based on the facet combinations present in the respective products. As an illustrative example, facets shown in the first product card 104A of "Price+New Release" may have a better combined ranking than the facets shown in the second product card 104B of "Popularity and New Release" and so forth. In various embodiments, products are selected and ranked to maximize facets and/or facet combinations shown to the user in facet-based context-aware user interface 102. In various embodiments, a carousel is not necessarily filtered based on facets shown on the product cards. For example, facet 106A refers to "Brand Maturity" and there may be other product cards in facet-based context-aware user interface 102 that do not have this facet. One such example is seen in FIG. 1 as product card 104D, which includes only a single facet, which implies, in at least some embodiments, that the only relevant facet for product shown in product card 104D is the "Screen Size" facet depicted in FIG. 1. While FIG. 1 depicts an illustrative, non-limiting user interface with up to two facets, any suitable number of facets may be rendered depending on the amount of UI space available. For example, some user interfaces may show up to three, four, or even more facets on product cards of facet-based context-aware user interface 102.

Returning to product card 104E, various facets may be associated with a product. The list of possible facets for a product may be defined at the product class level. For example, different facets that may be available for a class of televisions may include "Price", "New Release". "Popularity", "Screen Size", "Expert's Choice", "Brand Maturity", "Voice Control", combinations thereof, and more. Each individual product's attributes may be evaluated based on synthetic dimensions, factual dimensions, or combinations thereof. For example, whether a product supports Voice Controls or other features may be considered factual information related to a product. Conversely, product reviews by experts indicating that a product is well-regarded by experts in the field may be considered synthetic information.

More specifically, factual dimension and synthetic dimension may be considered as follows: data of product in factual dimension is informational. Factual dimension could be product attributes in catalog (e.g., brand, color, size) or offer-level properties (e.g., shipping speed, pricing), which represents product properties that can be used to adjust scope of product selection and assist in a purchasing decision. The factual dimensions used to identify substantive differences in the generic products are various among different product taxonomy. Data of product in synthetic dimensions is qualitative and can give insight for measuring how good/bad a product is in one aspect. For example, if a customer is shopping for a well-regarded television product. Data of actual dimensions tells the customer what brand each product belongs to, detail about features, price, and so forth. Performance of product in synthetic dimensions can tell the customer if the brand is popular based on consumer preferences (e.g., a segment of users similar to the customer) or if a product is rated highly by experts in the field.

As an illustrative, non-limiting example, FIG. 1 depicts a product card 104E in which two facets-facet 106A as "Brand Maturity" and facet 106B as "Expert's Choice"—are shown in the product card. As another example, product card 104A may have facet 106C "New Release." Different user interfaces may show different numbers of facets. For example, in screens with more display space, three facets may be shown per product. For screens in which less display space is available, perhaps only a single facet is shown per product. The number of products shown may be a function of the display density of the screen that is being used to present the facet-based context-aware user interface 102.

In various embodiments, a product is associated with several facets. A first product may be associated with a first set of facets and a second product may be associated with a second set of facets that are different from the first set of facets. In cases where a product is associated with more facets than there are to be displayed, different techniques may be used to determine facets for presentation. For example, and in accordance with FIG. 1, the facet-based context-aware user interface 102 may show up to two facets per product. If, for example, product associated with product card 104E has five facets, then two of the five facets may be selected for display. The selection of facets may be determined using various techniques. For example, a ranked list of facets may be associated with a product or product class. The ranked list of facets may be merged with a ranked list of substitute products so as to select facets that are highly ranked and/or diverse. For example, if a first card for a first substitute product shows hypothetical facets A and B, a second card for a second substitute product may show additional hypothetical facets C and D. In this manner, a greater diversity of facets may be shown to users, thereby assisting users to more easily express their purchase intents. For example, a user may select one or more facets shown in facet-based context-aware user interface 102 to provide additional intent context and update the list of products shown in facet-based context-aware user interface 102. These techniques may be implemented according to embodiments described elsewhere in this disclosure, for example, those discussed in connection with FIG. 2 below.

Figure 2:
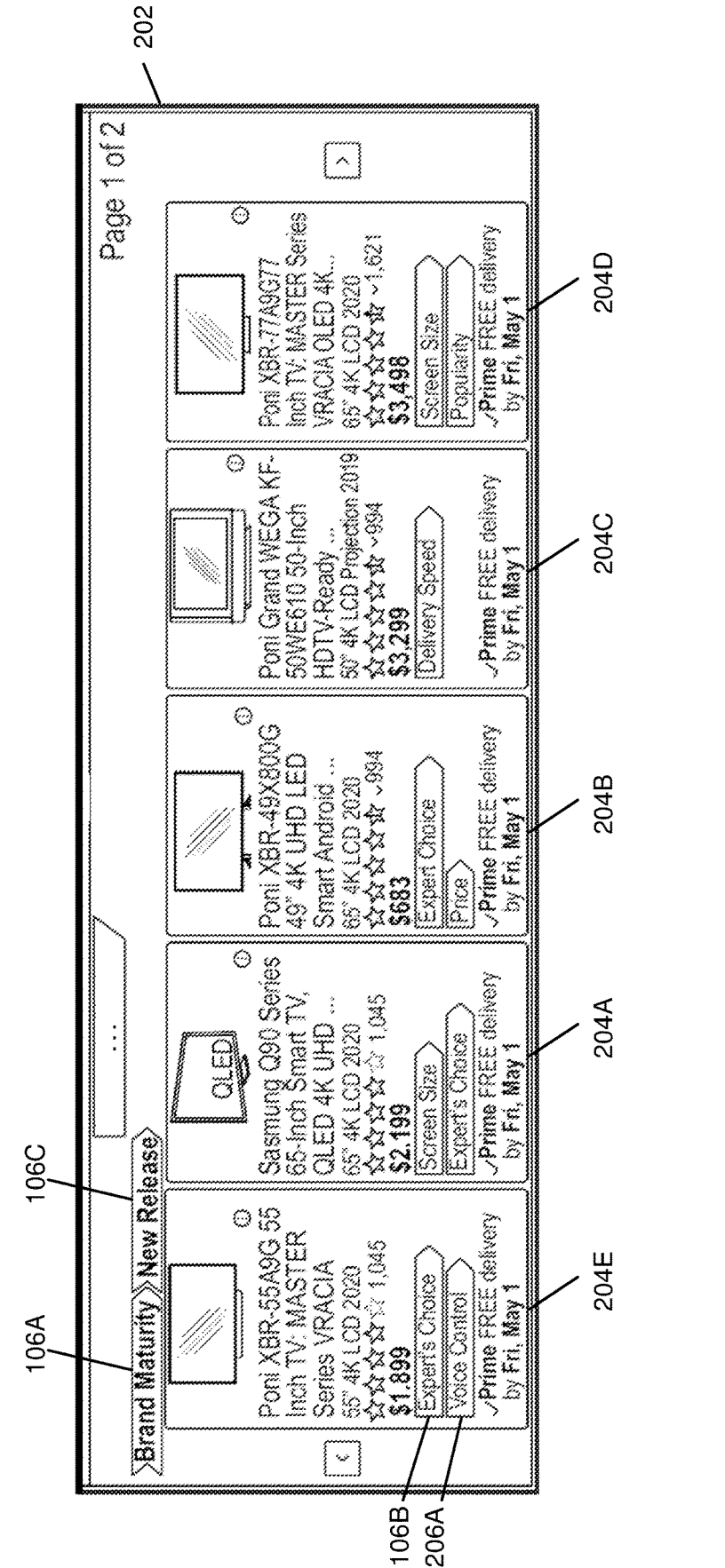
FIG. 2 illustrates an environment in which facets from a product card may be selected to update and refine the product recommendations shown in a facet-based context-aware user interface, in accordance with one or more example embodiments of the present disclosure.

FIG. 2 illustrates an environment 200 in which a facet-based context-aware user interface 202 is implemented, in accordance with one or more example embodiments of the present disclosure.

Facet-based context-aware user interface 202 may be similar to the facet-based context-aware user interfaces described in connection with FIG. 2. In various embodiments, FIG. 2 depicts intent-based facet selection by a user. As an illustrative example, FIG. 2 and FIG. 1 may be related by the selection, by a user, of a facet that is displayed in a product card of a facet-based context-aware user interface. The selection of a facet may be used as an intent context that an online purchasing system can use to determine products to surface to the user via a facet-based context-aware user interface 202.

In various embodiments, facet-based context-aware user interface 202 arises from facet-based context-aware user interface 102. Referring again to FIG. 1, a user may be presented with a list of substitute products in facet-based context-aware user interface 102. Product cards shown in facet-based context-aware user interface 102. The user may click, tap, or otherwise select a facet of a product card. For illustrative purposes, and in reference to FIG. 1, a user may select facet 106C "New Release" from product card 104A and select facet 106A "Brand Maturity" from product card 104E. Select of the facets may be used as intent contexts to update the list of products shown in the facet-based context-aware user interface. As a result of the user selection, the facet-based context-aware user interface of FIG. 1 may be refreshed or otherwise updated as the facet-based context-aware user interface 202 seen in FIG. 2.

Facet-based context-aware user interface 202 may be implemented as a smart widget that a user may navigate to see products (e.g., substitute products associated with a product of a product page). The product cards depicted in a facet-based context-aware user interface 202 may be determined based at least in part on a user intent context. User intent may be determined based on search queries, refinements, and other user interactions. User intent may be determined based on a selection of a facet by a user. For example, the selection of a particular facet may indicate that a user is interested in a particular facet, and that products with the specified facet should be favored over those that do not. In some embodiments, selection of a facet filters the products shown in facet-based context-aware user interface 202 so that products that lack the selected facet are excluded from presentation. However, such need not be the case—in some embodiments, selection of a facet up-ranks products with the selected facet so that they are displayed more prominently than those that are lack the selected facet. More prominent display may include graphical highlighting, display as a higher rank in a list of product, and so forth.

As depicted in FIG. 2, product cards 204A, 204B, 204C, 204D, and 204E may be displayed with various preview information related to various products. Furthermore, as depicted in FIG. 2, product card 204E may depict the same product as seen in product card 104E from FIG. 1. In various embodiments, selection of a facet may be used to restrict or otherwise determine which facets to display in a product card. For example, in FIG. 1, it can be seen that product card 104E refers to the "Poni XBR-55A9G 55 Inch TV" and product card 204E also refers to the same product. However, it is noted that in product card 104E, that the facets 106A "Brand Maturity" and 106B "Expert's Choice" are depicted in product card 104E, whereas product card 204E also displays facet 106B but displays facet 206A "Voice Control" instead of facet 106A "Brand Maturity". The different facets being displayed for product card 204E may be based on the user intent context, which includes the selection of facets 106A and 106C, as depicted in FIG. 2. The selection of these facets may be used to indicate that the intent context includes facets 106A (among others) and that facet 106A should not be displayed in the product card as the user has already expressed an interest in discovering more about facet 106A. Accordingly, a different facet 206A may be displayed in product card 204E that allows the user to discover additional facets related to the product.

In various embodiments, an online purchasing system is configured to determine a ranked list of products (e.g., substitute products) and provide the ranked list or a portion thereof for presentation at a user device, such as a desktop computer, laptop, smartphone, or other electronic device. The ordering of product cards shown in facet-based context-aware user interface 102 may be in accordance with the ranked list. The ranked list of products may be determined based on contextual, and may be determined based at least in part on intent contexts determined, for example, based on user search queries, refinements, and other user interactions that resulted in navigation by the user to a product page for a specific product. Facet-based context-aware user interface may be displayed as a list of substitute products that are ranked to provide an easy-to-use interface for exploring a diversity of substitute products that have different facets that may be of interest to the user. By providing a diversity of facets, the user may be able to explore a wider range of products quickly, more easily express the user's intent by selecting key facets of interest, and allow the user to more quickly and easily find a product that meet's the user's intent.

As seen in FIGS. 1 and 2, the values of the key factual dimensions as distinction with the displayed products are listed as tag between product title and review starts. A customer can click on a tag to add factual/synthetic dimension into widget context, and products shown in the widget may be refreshed (see FIG. 1). The updated list of products shown in the widget may include only those that are relevant user intent context (see FIG. 2). Selected dimensions are treated as explicit intent attributes and shown on top of the carousel, according to at least some embodiments. Customer can click a tag to remove it from the intent context. The similarity space among the products may be measured based on similarity and differences between products within same product taxonomy based on their features.

Figure 3:
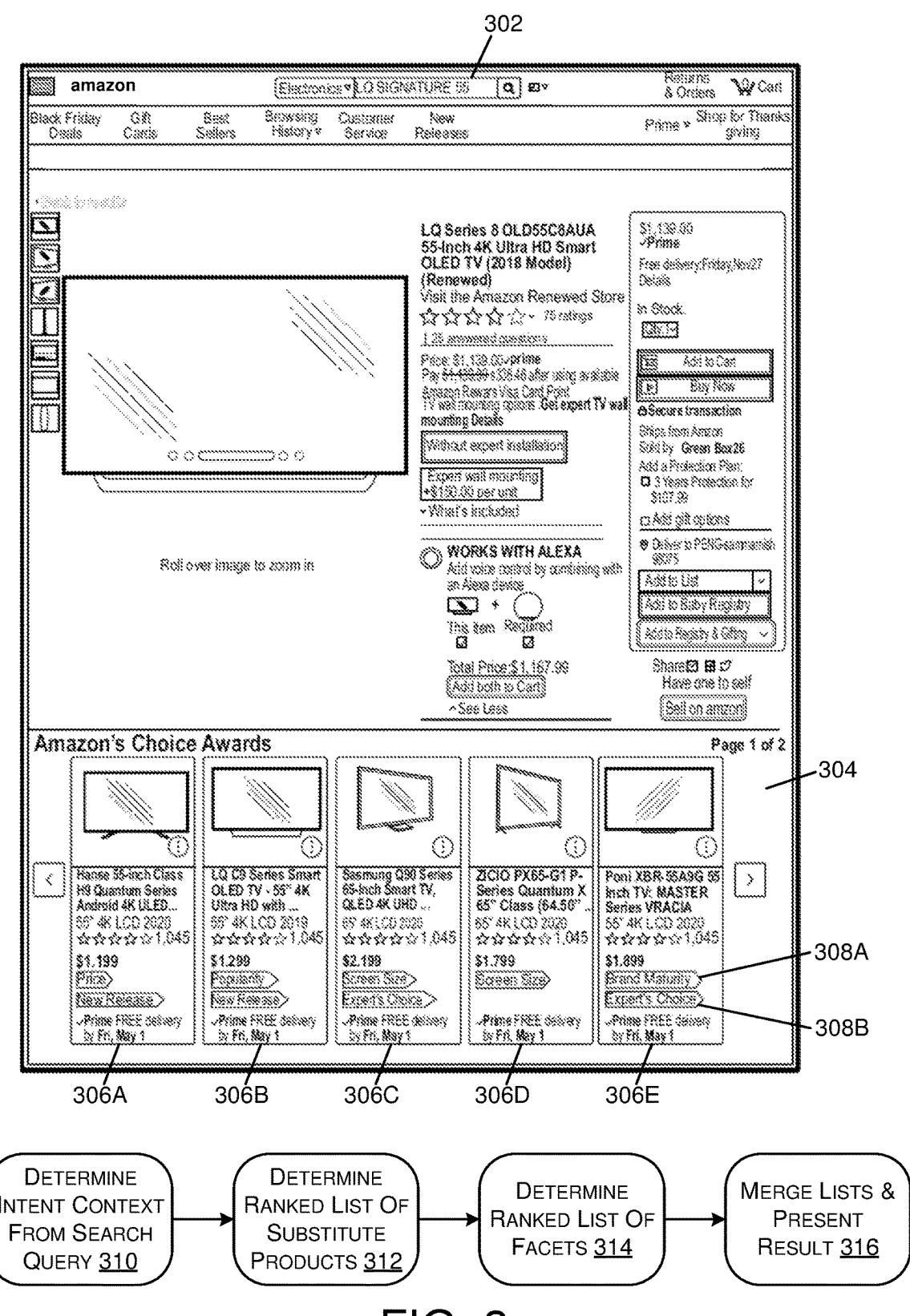
FIG. 3 illustrates an environment in which a browser-based user interface is implemented and depicts a detailed product page for a product, the detailed product page comprising a facet-based context-aware user interface, in accordance with one or more example embodiments of the present disclosure.

FIG. 3 illustrates an environment in which a browser-based user interface 300 is implemented, in accordance with one or more example embodiments of the present disclosure.

In at least one embodiment, FIG. 3 depicts a browser-based user interface 300 is implemented. A webpage may be displayed within a window of a browser of a personal computer, desktop system, laptop, tablet, or any other suitable computing device. In at least one embodiment, browser-based user interface 300 displays a product page for a product that includes various information about a product. A product page may be depicted in browser-based user interface 300. For example, the product page seen in FIG. 3 depicts a television along with information regarding its manufacturer name, model number, brand, brand type, release year, features (e.g., 4K LCD television), reviews, overall rating, price, and so forth. In various embodiments, browser-based user interface 300 includes a search bar 302 and a facet-based context-aware widget 304. Search bar 302 may provide a user with the ability to submit text-based search queries. Facet-based context-aware widget 304 may refer to a graphical interface of a product page that displays substitute products that a user may use to explore other products similar to the product seen in the product page.

A user may submit a search query using search bar 302. The search bar may be used as one interaction means by which a user can provide an intent context. Search may be used to understand customer intent and how to understand the customer intent based on the search request. Query understanding may be leveraged to fully parse the query term and identify each query term and which products the query term belongs to and which attribute and which attribute value the customer uses to search. Additional user intent context may be determined by customer refinement. Refinements may be determined based on click behavior to understand the search page and besides the organic search results. For example, if customer searched "televisions" they might start from a broad term "TV" or "LQ TV" and the customer purchase decision is usually not based just on this query. Customer might reformulate the query term, or click on a particular attribute to refine the search. Each of these user interactions may be considered an intent context. If customer started from LQ TVs and takes a look at all of the products purchased from attribute to this query term, these interactions can be used to understand which attribute the customer used to refine their query term or apply as the refinement, and finally find the product they want to buy. Additionally, user intent can also base on the search mission and determining which attributes customer clicks on and/or the order in which attributes are selected by a user to refine search query results. User intent can be predicted based on a user's historical shopping data, browsing habits, preferences, and other information. Additionally, user intent can be determined based on whether a user uses the same query term or refinements and/or the user's subsequent behavior is consistent after landing on a product page.

FIG. 3 depicts a search bar with a search for "LQ SIGNATURE 55." The search query may be used to determine a customer's intent context. A full search query or parsed search query may be used to determine an intent context. For example, the search string "LQ SIGNATURE 55" in the search bar 302 depicted in FIG. 3, may be parsed to determine a specific manufacturer "LQ", a specific brand "SIGNATURE" by the manufacturer, and a screen size "55" that may be determined to be related to 55-inch televisions based on the context of the search. This information may be provided as user intent contexts to the online purchasing system and may be used by the online purchasing system in the determination of the ranked list of substitute products displayed in the facet-based context-aware widget 304.

An illustrative, non-limiting example of how facet-based context-aware widget 304 is generated is described as follows: historical customer behavior may be collected as a customer performs a search for a product. The customer may, for example, perform a search looking for 55-inch televisions by LQ, or may perform a refinement or filter to specify the user's search intent. The historical customer behavior may be used to determine which facets are most important to the user, and the facets may be ranked individually, or ranked as a n-tuple. For example, the online purchasing system may determine that "Price" is the first-ranked facet and "New Release" is the second-ranked facet. Alternatively, the combination of Price+New Release may be determined to be the highest ranked 2-tuple. In either case, the system may combine those two facets together and identify a substitute product that has both of the facets and display that product in the first product card 306A. Next, additional diversity of factual assets can be shown in product card 306B by using the search content and already-selected facets to determine a second product recommendation. The user's intent context—for example, from the user's search query—may be used to determine that the user is interested in a LQ manufactured television. Product card 306B may be used to select a substitute product from the same manufacturer (e.g., a factual facet) that is highest ranked based on the facet combination of "Popularity" and "New Release." Next, product cards 306C and 306D may be used to further explore different factual and/or synthetic facets by depicting different facets as interactable tags that the user can select and/or as text-based facets used to generate product titles shown in the product cards. As seen in FIG. 3, the user intent may indicate that the user is searching for a 55-inch TV, but historical user behavior may indicate that when users search for a 55-inch television, sometimes they select 60-70 inch televisions, or other sizes. This intent context may be used to identify one or more televisions that have different screen sizes from what the user explicitly indicated in the search query, the different screen sizes being selected or determined based on historical user behavior. Accordingly, in product card 306C, one or more factual facets of the product may be varied from the user's search query based on historical user behavior to determine whether the user is indeed searching for televisions that are exactly 55-inches in size, or if the user is amenable to other screen sizes.

Facet-based context-aware widget 304 depicted in FIG. 3 may refer to an illustrative, non-limiting example of a type of facet-based context-aware user interface. As depicted in FIG. 3, facet-based context-aware widget 304 may display product cards 306A, 306B, 306C, 306D, 306E, and so forth. A product card may display or otherwise graphically surface facets related to the products. For example, product card 306E depicts facets 308A and 308B that are relevant to the product depicted in product card 306E. Product cards and/or facets depicted in facet-based context-aware widget 304 may be determined according to steps 310-316.

As depicted in FIG. 3, product cards can have intractable user interface elements for facets 308A and 308B, for example. A user may interact with facet 308A or other facets of facet-based context-aware widget 304 by selecting the facet to refine the list of product cards shown in the user interface. In addition to facets 308A and 308B that are shown as discrete, intractable user interface elements, Facets can be displayed in the products card as text, such as within the product title. For example, factual facets relating to a product, such as the manufacture, brand, screen size, price, release year, technical features (e.g., OLED screen type, refresh rate, voice command capabilities, and so forth). In various embodiments, facets 308A and 308B shown as discrete elements may be synthetic facets and/or factual facets. Text-based facets that are embedded in a product card may be factual facets but not synthetic facets. Text-based facets, such as factual facets embedded within a product short title or description may be different from facets 308A and 308B in the sense that the user is not able to click on those facets to refine a search. Clicking on "OLED" in the product title of product card 306B may result in the user navigating to the detailed product page for the product depicted in product card 306B, as would the user clicking on other parts of the product card, such as the preview image of the product.

Different factual facets can be shown in text-based fields of a product card and may be used to determine customer intent. For example, in FIG. 3, the search string may be for "LQ SIGNATURE 55" which as, discussed above, may describe a manufacturer, a brand, and a screen size. These can each be considered factual facets, and we can vary one or more of these dimensions in the product search. For example, the search query is for 55-inch TVs, but we also show 65-inch TVs to see whether the user wants exactly a 55-inch TV, or if they want a large TV and is okay with other sizes similar to the screen size specified in the search string. Likewise, the facet-based context-aware widget can show TVs from other manufacturers, other models by the same manufacturer to better identify customer intent.

User interactions may be used to determine and update user intent contexts. As a non-limiting, illustrative example, consider an example in which a customer searches for "LQ SIGNATURE 55" as depicted in FIG. 3 and navigates to a detailed product page for such a product. From the product page, then the user may click on a product card in facet-based context-aware widget 304, such as product card 306E for "Poni XBR-55A9G 55 Inch TV". Based on the selection of the second product, additional intent context can be determined based on the search query and/or product attributes of the product page displayed in browser-based user interface 300, and/or selected product card. As can be seen, the product page shown in browser-based user interface 300 is for a television product of a first manufacturer "LQ" and the selection of product card 306E is for a television product of a second manufacturer "Poni." In this scenario, the online purchasing system may determine the manufacturers are different, but that the screen sizes are similar, so the intent is related to the screen size rather than a specific manufacturer. This intent context may be retained and carried over to the product page of "Poni XBR-55A9G 55 Inch TV" selected by the customer, and may be used to determine appropriate substitute products to show on a facet-based context-aware widget for the Poni product.

In various embodiments, customer intent can change over time. For example, if user searches for "LQ SIGNATURE 55", but then navigates to a first Poni television, second Poni television, third Poni television, and so forth, it may be determined that the user's intent has changed during the search and that the user's manufacturer preference is for Poni televisions, rather than for LQ televisions, as would have been indicated by the intent context from search bar 302. In various embodiments, an online purchasing system may discard prior intent contents when more recent intent contexts are indicative of a change in preference. For example, it may be the case that using intent contexts over the past N interactions results in higher confidence scores for recommendations than using the past M interactions where M>N.

In at least one embodiment, an online purchasing system performs some or all of steps 310-316. For example, step 310 may refer to a step to determine an intent context from search query. Generally speaking, intent context may be determined from a search query submitted by the user, a refinement of a search query, or other user interactions that may be used to determine user intent or provide contextual intent information that may be used to determine or update how a list of substitute products should be ordered for optimal presentation to a user.

Customer intent context may be determined based on various types of customer interactions with an online purchasing system. For example, a customer may submit a search query and interact with a search results page, select a first search result, and then navigate to a product details page for the first product. A customer's intent context may be retained or discarded when the user navigates from one page to another. For example, if a customer makes the selection of a product card in the facet-based context-aware widget 304, then the intent context may be retained when the user navigates to the product page of the selected product. However, if the user uses a different widget or user interface element to select a different product—for example, a different recommendation widget that is not facet-based—then the intent context may be cleared or discarded when the user navigates to the product page of the different product. Intent context for this different product may, therefore, be cleared and a facet-based context-aware widget for this product may be shown based solely on the intent context determined from the attributes of the product shown on the product page.

At step 312, an online purchasing system may determine a ranked list of substitute products. The ranked list of substitute products may be determined based at least in part on user intent context. For example, if the user's search query is "LQ SIGNATURE 55" the user intent extracted from the search query may be that the user is searching for 55-inch televisions. Accordingly, the ranked list of substitute products may include televisions that are considered similar based on manufacturer, brand, and/or screen size.

At step 314, an online purchasing system may determine a ranked list of facets. The ranked list of facets may be determined at the product class level. Product class is the more granular taxonomy than product type. For example, "TV" may be considered a product type, and the product class can be viewed as a sub-type, like Curve Screen TV, LCD TVs, and so forth.

A set of facets may be available for each product class, such that products of the product class may be assigned to have or not have per-class facets. Product data used to determine facets may include data from detailed product page and/or user behavior. Typically, a customer doesn't provide all intent context from a search. Sometimes, the customer uses the query term or refinement to provide part of the attributes that impacts their shopping decision, but not all. For example, an interaction pattern used by customers may be that they find a product that matches their product requirements, they go to the detail page, and from detail page, they can see substitute recommendations. In various embodiments, machine-learning is used to infer for each product, when the user click on a substitute product, which attributes changed and which ones stayed the same. From customer behavior, an online purchasing system can identify which key attributes impact the substitute recommendation experience, and those attributes may be selected as facets that can be present in a product class.

Facets may be ranked according to various algorithms. One way in which facets may be ranked is based on popularity of similar products on the detail page. For example, if customer goes to a detailed product page and 60% of the customers purchased substitute product X and 70% purchased substitute product Y, this information may be used to rank the products.

After determining a ranked list of substitute products and a ranked list of facets, step 316 may be used to merge the ranked list of substitute products and ranked list of facets and provide the results for presentation at a client device. An online purchasing system may merge the ranked facets and ranked products. Based on the ranked products from top of bottom, the online purchasing system may scan the products. For the top product, it may match the top N facets and then tag those facets on the product card of the product. For example, if N=2, the top product may match the top two ranked facets. For the next product, product may match the best and third-best facets. These may, accordingly, be displayed on the product card for the second-ranked product.

In some embodiments, products may be up-ranked or down-ranked to increase diversity of facets. For example, if Product X and Product Y are both considered highly ranked substitute products with the top-4 ranked facets {A, B, C, D} of the product class, they may both be shown, in the facet-based context-aware widget. Product X may be shown with facets A and B, and Product Y may be shown with facets C and D to provide greater diversity of facets presented in the facet-based context-aware widget. As another example, Product X may be shown with facets A and C, and Product Y may be shown with facets B and D. Regardless, various combinations of facets may be surfaced with Product X and Product Y to provide for diversity of facets.

Consider, for example, if Product Z also had identical facets with Product X and Product Y and Product W had facet E that is lower-ranked than facets A-D. Product W may be up-ranked to be presented above Product Z so as to provide for greater diversity of facets, given that the facets that are associated with Product Z are already represented by Product X and Product Y.

Various techniques for preventing abuse of recommendation ranking logic after rending product performance data in variable dimensions are discussed below. A recommendation pipeline may leverage many different signals and/or types of signals to identify risk that a product curated and featured across an online shopping system's placements leads to a poor shopping experience due to concerns related to quality/defects, and rank products relevant with purchase intent based on brand maturity, purchase popularity, expert feedback, and other features. Facet-based dimensions may be visualized on product placements allowing customers to indicate their shopping intent. In contrast, the details regarding variable-based dimensions may be obscured so as to avoid overloading the user with too much information. Product performance in variable-specific dimensions could be quantified and show dimensional scores in a facet-based context-aware user interface. A weighted value may be assigned to each dimension and may be tuned—for example, using a machine-learning model—based on customer behavior data. For each type of product, dimensions may be ranked individually based on their impacts on customers' purchase decisions. Besides purchase volume, other dimensions may be placed under consideration, such as price competitiveness, customers' perceptions of a brand, how often consumers interacted with the brand and the product, and perception of replenishment purchase on the product.

Figure 4:
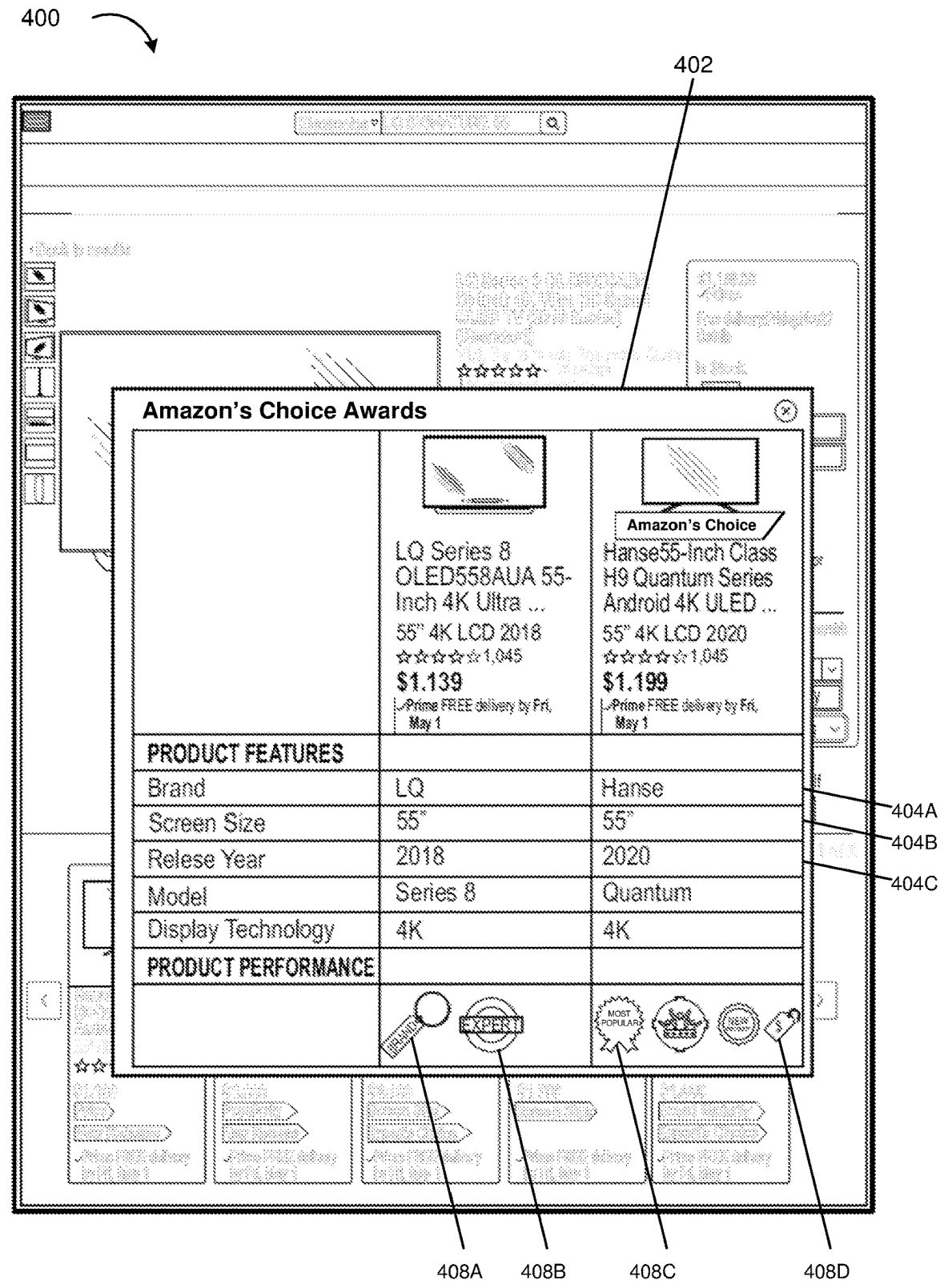

FIG. 4 illustrates an environment 400 in which a product comparison user interface 402 is implemented, in accordance with one or more example embodiments of the present disclosure. In various embodiments, a customer may access the product comparison user interface from a detailed product page (e.g., as depicted in FIG. 4) by selecting a substitute product to perform a comparison with.

In at least one embodiment, product comparison user interface 402 is implemented in the context of a browser-based user interface, such as those described in connection with FIG. 3. In various embodiments, facets associated with a product may be displayed as visual icons, badges, doodads, or other image-based assets.

For example, a user may select two or more products to compare and the comparison of the products may be presented in product comparison user interface 402. Items may be compared through a selection interface where a user can select two or more products to compare. For example, a product shown in a product page may be compared against one or more substitute products presented in a carousel. As a second example, a first substitute product may be compared against a second, third, fourth, etc. substitute product of the substitute products carousel.

In various embodiments, attributes such as attributes 404A, 404B, and 404C may be determined to be attributes of interest to the user based on intent context. For example, attributes 404A, 404B, and 404C may refer to highly-ranked factual dimension of the products that have been determined to be relevant to the user. For example, if a user submits a search query based on brand and screen size, these may be considered to be important factors in the user's intent context and may be displayed in the comparison to allow for the user to compare these important factual attributes. For example, the top N factual facets for a product class may be determined based at least in part on user intent and the factual aspects may be displayed for the products being compared, regardless of whether the products have the facets. For example, if one of the top factual facets is related to "Voice Control" but one of the products does not support voice control, it may nevertheless be presented in the product comparison user interface 402 as the lack of voice control may be relevant to the customer's purchase decision.

Product comparison user interface 402 may display one or more synthetic dimensions as icons, such as icons 408A, 408B, 408C, and 408D depicted in FIG. 4. These are merely illustrative in nature and not intended to be limiting. Synthetic facets that are applicable to a product may be displayed as graphical icons. For example, icon 408A may be an icon that represents that a product with the icon has "Brand Maturity" and icon 408B may refer to "Expert's Choice" facet and icon 408C may refer to "Popularity" facet and facet 408D may refer to "Price" facet. Unlike factual dimensions, the synthetic dimensions may be displayed as graphical icons only when they apply to the particular product. Accordingly, it may be the case that an icon representing a synthetic dimension applies only one product but not another.

Figure 5A:
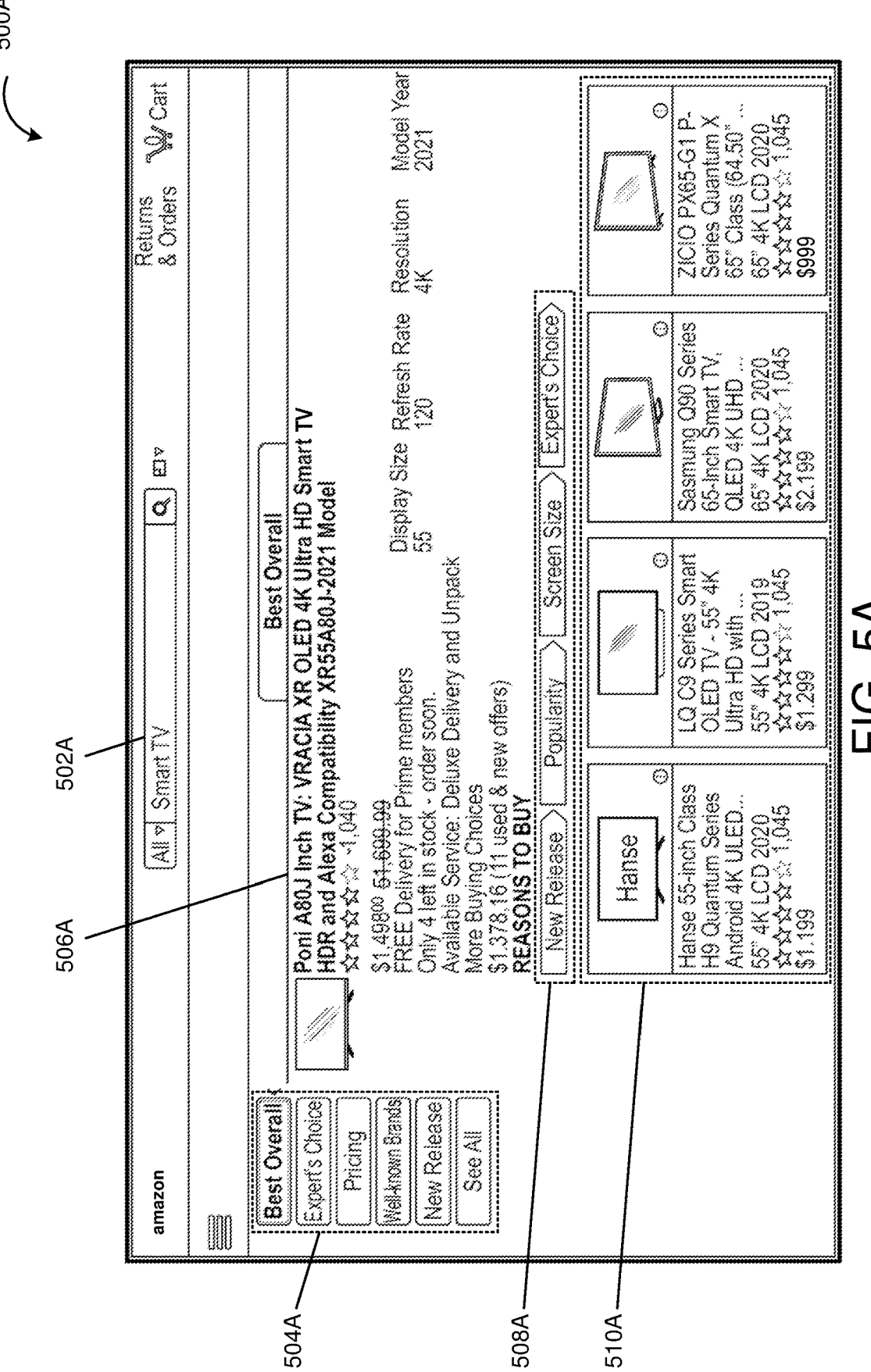
FIG. 5A illustrates an environment in which a facet-based context-aware user interface is implemented in the context of a search results page, in accordance with one or more example embodiments of the present disclosure.
Figure 5B:
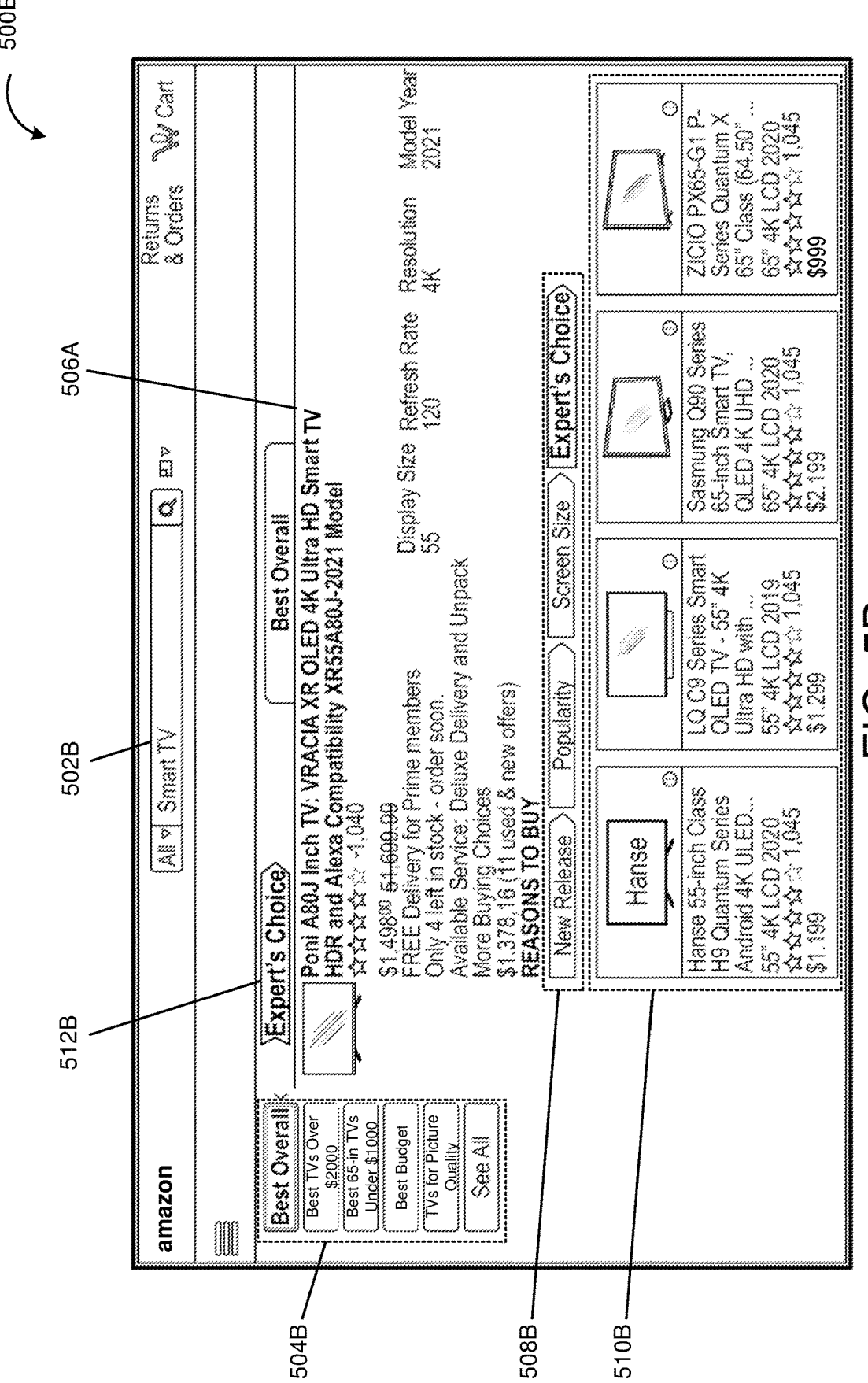
FIG. 5B illustrates an environment in which a facet-based context-aware user interface is updated or refined within the context of a search results page upon the selection of one or more facets, in accordance with one or more example embodiments of the present disclosure.

FIG. 5A illustrates an environment in which a search results page 500A is implemented, in accordance with one or more example embodiments of the present disclosure. FIG. 5A may be discussed in conjunction with FIG. 5B and in accordance with various embodiments, both FIGS. 5A and 5B are implemented in the context of the same product page.

FIG. 5A depicts a search results page 500A that includes, among other graphical elements, a search bar 502A. The search bar 502A may be used as one interaction means by which a user can provide an intent context. Search may be used to understand customer intent and how to understand the customer intent based on the search request. Query understanding may be leveraged to fully parse the query term and identify each query term and which products the query term belongs to and which attribute and which attribute value the customer uses to search. Additional user intent context may be determined by customer refinement.

FIG. 5A depicts a search results page 500A that includes, among other graphical elements, a side bar 504A in which various refinement options may be presented to a user. The refinement options may be synthetic or factual dimensions by which a user may refine product search results. The side bar options may be determined based on a facet ranking or may be determined based on user intent contexts such as search queries and refinement interactions submitted by the user. Side bar 504A may provide for refinement options that allow a user to express more detailed intent on the type of product that the user intends to purchase. Refinement may, in some cases, involve filtering. For example, if a user selects "Expert's Choice" from side bar 504A, then the search results may be filtered to include only product results that are tagged as being recommended by experts. Refinement may, in some cases, involve sorting. For example, if a user selects "Pricing" from side bar 504A, then the search results may be sorted by price in ascending or descending order.

In various embodiments, a search results page 500A displays a list of results in a top-down manner. FIG. 5A depicts one such search result 506A. Other search results (not depicted in FIG. 5A) may be displayed sequentially underneath search result 506A in a manner that a user may scroll down to see the second, third, fourth, etc. search results matching the user's search query. Search result 506A may include information regarding a product that satisfies a search query and/or refinements applied to the search results. The search result may include image-based and text-based information about a product. In various embodiments, the search results page 500A may display to the user a list of product cards that surface the top N synthetic facets. Each card may be specific to one or more synthetic facets. For example, one synthetic facet may be surfaced for each product, as depicted in the facet-based information 508A above the list of substitute products 510A. In various embodiments, the top N synthetic facets for a given search context and then for each of the N synthetic facets, a top-ranked or otherwise suitable substitute product is selected for each of the respective facets.

In various embodiments, search results page 500A includes additional facet-based information 508A that can assist in product discovery by the user. Facet-based information 508A may refer to facets of a search result. For example, if the user sees facet-based information 508A of the top result, the user may see various facets about the top search result that expresses different dimensions along which the product is believed to be relevant to the user's intent context. For example, the user may find it easier to find similar products to the search result 506A by selecting one or more of the facets. This scenario is depicted in FIG. 5B.

Finally, FIG. 5A depicts a search results page 500A that includes, among other graphical elements, a list of substitute products 510A. The list of substitute products 510A may refer to products that are similar to the search result 506A. In some embodiments, substitute products are shown in connection with only some—but not all—search results. In various embodiments, facet information may be surfaced within the list of substitute products 510A.

Product 506A is depicted with multiple factual facets-display size, refresh rate, resolution, model year. Widget 510A can be used to show different factual facets. For example, the product descriptions may vary based on one or more of the factual facets shown in result 506A—two substitute products in widget 510A are shown with the same display size (55-inches) as 506A, different screen types (e.g., OLED, ULED, QLED), and so forth. These can be used to determine user preferences along those factual facets based on user selecting on a product with a specific factual facet value or multiple selections with the same value to confirm a preference. Additionally, price can be another factual facet that is explored. FIG. 5A shows product 506A, and showing TVs with lower and/or higher prices can be used to explore and determiner customer intent with respect to budget.

FIG. 5B illustrates an environment in which a search results page 500B is implemented, in accordance with one or more example embodiments of the present disclosure. FIG. 5B may be discussed in conjunction with FIG. 5A and in accordance with various embodiments, both FIGS. 5A and 5B are implemented in the context of the same product page.

FIG. 5B may display various graphical elements similar to those described in connection with FIG. 5A. For example, search bar 502B, side bar 504B, search result 506B, facet-based information 508B, and list of substitute products 510B may serve similar functions and be implemented similar to FIG. 5A, within the context of the additional discussions of FIG. 5B below.

FIG. 5B may depict a scenario that arises out of FIG. 5A in which a user selects a facet. The selected facet may be used to filter the search results. For example, as seen in FIG. 5B, a user may select the facet "Expert's Choice". This may result in that facet being selected or otherwise highlighted in facet-based information 508B and also displayed at location 512B at the top of the search results, so as to provide the user with a visual indication that a filter is being applied based on the selected facet.

Selection of facet may result in various updates to search results page 500B. In some embodiments, the search results are filtered so that the second, third, fourth, etc. search results are updated to exclude any results that do not have the selected facet. In some embodiments, the substitute products lists are updated to exclude any results that do not have the selected facet. In some embodiments, the side bar 504B is updated so that the side bar elements whose relevance is determined based on additional intent context provided by the selected facets. For example, for users that select "Expert's Choice" the refinement options may be updated to show different filtering/sorting options based on user behavior collected in connection with the selected facet.

Figure 6A:
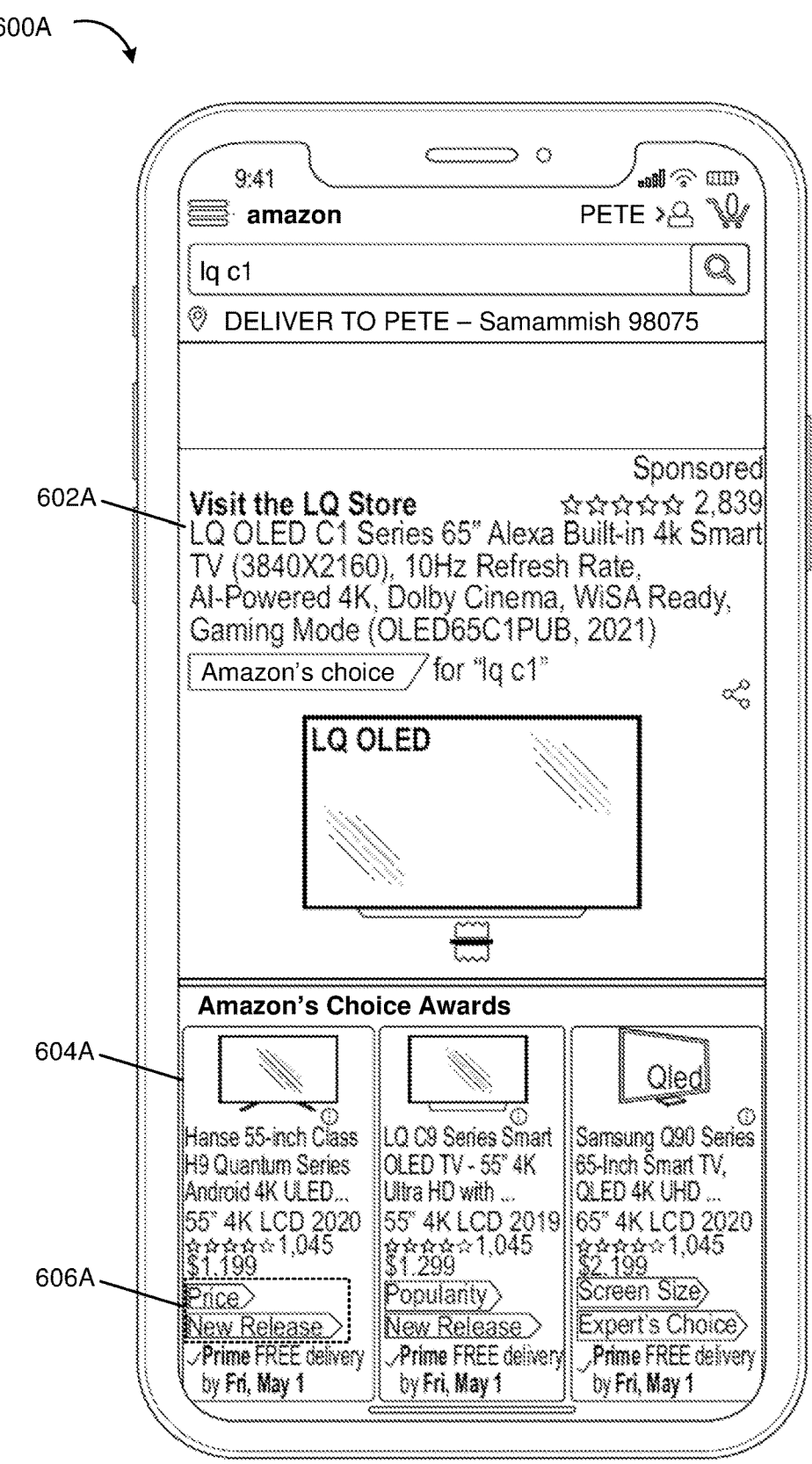
FIG. 6A illustrates an environment in which a mobile application user interface is implemented, in accordance with one or more example embodiments of the present disclosure.

FIG. 6A illustrates an environment in which a mobile application user interface 600A is implemented, in accordance with one or more example embodiments of the present disclosure.

In at least one embodiment, mobile application user interface 600A is implemented on a mobile device such as a smartphone or tablet device. A mobile application may be downloaded and installed on the device to provide capabilities depicted in the mobile application user interface 600A of FIG. 6A. In at least one embodiment, a user navigates to mobile application user interface 600A via a search query result or refinement thereof. The navigation of the user to product card seen in the mobile application user interface 600A may include the conveyance of one or more intent contexts, such as a first intent context from a search query and a second intent context based on an interaction with the search query, such as a refinement selection.

Search result 602A may be depicted for a user search query. Product details may be surfaced in response to a user interaction, such as tapping on a product of interest to the user from a search results list. The search result 602A may include various graphical and/or text-based information regarding the product, such as manufacturer name, model number, brand, brand type, release year, features (e.g., 4K LCD television), reviews, overall rating, price, and so forth. FIG. 6A depicts a search result 602A for the search string "lq c1" which may refer to a manufacturer "LQ" and a type of television "C1" by the manufacturer. Other search results-such as a second, third, fourth, etc., search result may also be presented to the user in mobile application user interface 600A by a scrolling or swiping interaction by the user.

The mobile application user interface 600A may include a facet-based context-aware widget 604A that is shown inline with the search results. For example, the facet-based context-aware widget 604A depicted in FIG. 6A may surface a list of substitute products associated with a search result, such as search result 602A or other search results determined in response to a user search query or refinement thereof. In various embodiments, the facet-based context-aware widget 604A includes a list of substitute products that is determined by merging a ranked list of substitute products and ranked list of facets. The merging of the ranked list of substitute products and the ranked list of facets may be performed to provide a wider diversity of substitute products that allows a user to more easily express and refine a purchase intent. For example, some or all substitute products shown in facet-based context-aware widget 604A may include facets 606A that are surfaced in a product card. A diversity of facets may be shown—for example, if three product cards are simultaneously shown in mobile application user interface 600A and each product card can show up to two facets, then up to six different facets can be simultaneously displayed to the user. This allows the user to easily identify and express purchase intents and to provide additional intent context by simply tapping on a facet of interest.

Figure 6B:
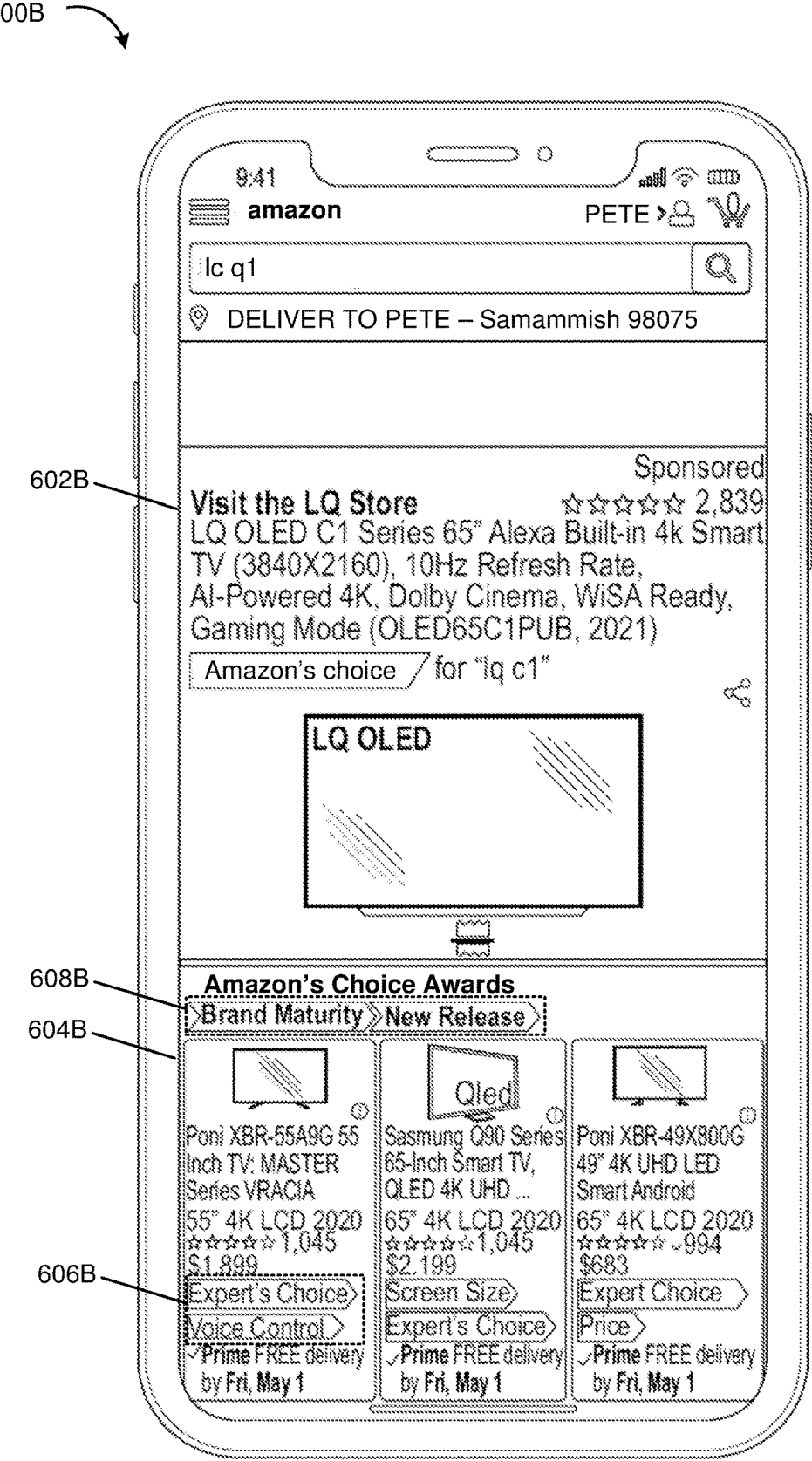
FIG. 6B illustrates an environment in which a mobile application user interface is implemented, in accordance with one or more example embodiments of the present disclosure.

FIG. 6B illustrates an environment in which a mobile application user interface 600B is implemented, in accordance with one or more example embodiments of the present disclosure.

In at least one embodiment, a user interacts with mobile application user interface 600A by tapping on or otherwise selecting a facet to produce mobile application user interface 600B. As depicted in FIG. 6B, mobile application user interface 600B may comprise a facet-based context-aware widget 604B that presents a list of substitute product cards. As an illustrative, non-limiting example, a user may select a facet for "Brand Maturity" and "New Release" to produce mobile application user interface 600B. Selection of a facet may indicate a user intent context. For example, when a user taps on a facet for "New Release" the user's list of substitute products may be updated to include only products that have the "New Release" property. FIG. 6B depicts a scenario in which a user has selected two facets 608B-"Brand Maturity" and "New Release"—and facet-based context-aware widget 604B displays product cards for products that match the user's intent. For example, it should be appreciated that product cards shown in mobile application user interface 600A of FIG. 6A and mobile application user interface 600B of FIG. 6B may be different based on the selection of facets 608B in FIG. 6B. For example, the products shown in FIG. 6A may not match the customer intent context once facets 608B have been selected. Additionally, the facets shown in the product cards to assist in customer product discovery may be different. For example, FIG. 6A depicts facets within product cards for "New Release" but FIG. 6B will not, as the "New Release" facet has already been selected in FIG. 6B, and other facets, if available, may be displayed to provide the customer with more discoverability options.

FIG. 7 shows an illustrative example of a process 700 for determining a facet-based context-aware user interface, in accordance with one or more example embodiments of the present disclosure. In at least one embodiment, some or all of the process 700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1 and 8. In at least one embodiment, process 700 or a portion thereof is implemented by an online purchasing system.

In at least one embodiment, process 700 comprises a step 702 to determine one or more intent contexts based at least in part on one or more user interactions with an online purchasing system. The intent contexts may be determined based on user interactions such as a user submitting a search query that serves as a first intent context, a refinement of the search query that serves as a second intent context, and so forth. In some embodiment, additional intent contexts may be determined based on user navigation, for example, from one product page to another, wherein the intent contexts of a previous product page may be retained when the user navigates to a subsequent product page. Users may, for example, select a facet displayed in a facet-based context-aware widget to provide an additional intent context and facilitate product discovery.

In at least one embodiment, process 700 comprises a step 704 to determine a first product of an online purchasing system. The first product may be determined in any suitable manner and may be used to determine how to populate substitute products for the first product, for example. The first product may be a product that is shown in the search results of a user's search query, in a detailed product page when a user selects the first product from a list of products shown in a search result, and so forth.

In at least one embodiment, process 700 comprises a step 706 to determine a plurality of facets based on a product class of the first product. A set of facets may be available for each product class, such that products of the product class may be assigned to have or not have per-class facets. Product data used to determine facets may include data from detailed product page and/or user behavior. Typically, a customer doesn't provide all intent context from a search. Sometimes, the customer uses the query term or refinement to provide part of the attributes that impacts their shopping decision, but not all. For example, an interaction pattern used by customers may be that they find a product that matches their product requirements, they go to the detail page, from detail page, they can see substitute recommendations. In various embodiments, machine-learning is used to infer for each product, when the user click on a substitute product, which attributes changed and which ones stayed the same. From customer behavior, an online purchasing system can identify which key attributes impact the substitute recommendation experience, and those attributes may be selected as facets that can be present in a product class.

In at least one embodiment, process 700 comprises a step 708 to determine a first ranked list of substitute products associated with the first product and based at least in part on the one or more intent contexts. An online purchasing system may determine the first ranked list of substitute products. The ranked list of substitute products may be determined based at least in part on user intent context, such as a user search query. For example, if the user's search query is "LQ SIGNATURE 55" the user intent extracted from the search query may be that the user is searching for 55-inch televisions. Accordingly, the ranked list of substitute products may include televisions that are considered similar based on manufacturer, brand, and/or screen size.

In at least one embodiment, process 700 comprises a step 710 to determine a ranked list of facets associated with the first product, wherein the ranked list of facets at least partially overlaps with the plurality of facets associated with the first product. The ranked list of facets may be determined using machine-learning that determines the relevancy of various dimensions of a product class to purchasing decisions, selects at least some of the dimensions (e.g., based on influence) as facets, and then ranks the facets based on the intent context. For example, if a user's search intent includes the model number for a newly released product, then a "New Release" of the relevant product class facet may be considered contextually relevant based on the search string.

In at least one embodiment, process 700 comprises a step 712 to merge the first ranked list of substitute products and the ranked list of facets to determine a second ranked list of substitute products comprising at least a portion of the first ranked list of substitute products. An online purchasing system may merge the ranked facets and ranked products. Based on the ranked products from top of bottom, the online purchasing system may scan the products. For the top product, it may match the top N facets and then tag those facets on the product card of the product. For example, if N=2, the top product may match the top two ranked facets. For the next product, product may match the best and third-best facets. These may, accordingly, be displayed on the product card for the second-ranked product.

In at least one embodiment, process 700 comprises a step 714 to present, at a user device, a facet-based context-aware user interface that includes the second ranked list of substitute products, wherein a first substitute product of the second ranked list is associated with a first set of facets and a second substitute product of the second ranked list is associated with a second set of facets different from the first set of facets. The facet-based context-aware user interface may be displayed on a user device in the context of a web browser, application, mobile application, and so forth. In various embodiments, the second ranked list is displayed within a product page or in association with a product shown in a search result. A user may select a facet or a product to provide the system with additional intent context. For example, if a user selects a substitute product, the user may navigate away from a present interface to a detailed product page for the selected substitute product. A second facet-based context-aware user interface may be shown in this product page that includes intent context that comprises the one or more intent contexts referenced in step 702 above and additional intent context determined through additional user interactions, such as the selection of the substitute product, selection of one or more facets in the previous page, and so forth. The additional intent context may be used to further refine or assist with the user's discovery of facets relevant to the user's purchase intent.

One or more operations of the methods, process flows, or use cases of FIGS. 1-8 may have been described above as being performed by a user device, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

FIG. 8 illustrates a block diagram of an example of a machine 800 (e.g., implemented in whole or in part in the context of embodiments described in connection with other figures. In some embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in Wi-Fi direct, peer-to-peer (P2P) (or other distributed) network environments. The machine 800 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include any combination of the illustrated components. For example, the machine 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (e.g., drive unit) 816, a signal generation device 818, and a network interface device/transceiver 820 coupled to antenna(s) 830. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

Facet-based interface subsystem 836 may refer to software, hardware, or a combination thereof that determines, facilitates, or otherwise is utilized in connection with facet-based context-aware user interfaces described herein. For example, facet-based interface subsystem 836 may be a subsystem of an online purchasing system that is used to determine a list of substitute products to show based at least in part on user intent and facets associated with a product class of the substitute product. Facet-based interface subsystem 836 may be used to implement various techniques described throughout this disclosure, including some or all of those described in connection with FIGS. 1-7.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating." when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second." "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Additionally, features of various system and methods described herein that are implemented "by" or "based on" performing a step are to be construed or may be synonymous to "by at least" or "based at least in part on" performing said step rather than "by solely" or "based solely on" performing said step, unless it is explicitly stated or clear from the context. For example, a system that implements specific features "by" performing a particular step may be described in a manner that is not exclusive of the performance of other steps, some of which may be related to said particular step. In some cases, other steps may be omitted from various discussions for the sake of clarity.

What is claimed is:

1. A system, comprising:

one or more processors; and memory storing executable instructions that, as a result of execution by the one or more processors, cause the system to:

determine one or more intent contexts based at least in part on one or more user interactions with an online purchasing system, determine a plurality of facets associated with a first product of the online purchasing system;

determine a first ranked list of substitute products associated with the first product and based at least in part on the one or more intent contexts;

determine a ranked list of facets associated with the first product, wherein the ranked list of facets at least partially overlaps with the plurality of facets associated with the first product;

merge the first ranked list of substitute products and the ranked list of facets to determine a second ranked list of substitute products comprising at least a portion of the first ranked list of substitute products; and cause presentation of a first facet-based context-aware user interface that includes the second ranked list of substitute products, wherein a first substitute product of the second ranked list is associated with a first set of facets and a second substitute product of the second ranked list is associated with a second set of facets different from the first set of facets, wherein the presentation of the first substitute product within the second ranked list of substitute products includes a first selectable icon indicative of a first facet in the first set of facets, and a second presentation of the second substitute product within the second ranked list of substitute products includes a second selectable icon indicative of a second facet in the second set of facets.

2. The system of claim 1, wherein the one or more intent contexts comprises:

a first intent context, based at least in part on a search query; and a second intent context, based at least in part on a refinement of the search query.

3. The system of claim 1, wherein system is configured to merge the first ranked list of substitute products and the ranked list of facets by at least:

determining a first ranked facet;

determining that the first substitute product matches the first ranked facet;

determining a second ranked facet; and determining that the second substitute product matches the second ranked facet.

4. The system of claim 3, wherein system is further configured to:

determine a third substitute product of the first ranked list is associated with the first ranked facet; and determine that the first ranked facet is represented in the second ranked list by the first substitute product; and exclude the third substitute product from the second ranked list.

5. The system of claim 1, wherein the plurality of facets associated with the first product are associated with a product class of the first product.

6. The system of claim 1, wherein the system is further configured to:

determine selection of a first facet of the first set of facets;

determine an intent context based on the selection of the first facet; and determine a third ranked list of substitute products based at least in part on the selection of the first facet, wherein the substitute products lacking the first facet are excluded from the third ranked list.

7. The system of claim 6, wherein the system is further configured to:

determine selection of the first substitute product of the third ranked list; and cause presentation of a second facet-based context-aware user interface for the first substitute product, wherein the second facet-based context-aware user interface comprises a fourth ranked list of substitute products, wherein the fourth ranked list is determined based at least in part on the intent context.

8. The system of claim 1, wherein the first product is determined from a search query result provided in response to a user search query.

9. The system of claim 1, wherein the first selectable icon is configured to cause the presentation of a third ranked list of substitute products, wherein a third substitute product of the third ranked list is associated with the first facet and a fourth substitute product of the third ranked list is associated with the first facet.

10. A non-transitory computer-readable storage medium storing executable instructions that, as a result of being executed by one or more processors of a device, cause the device to at least:

determine one or more intent contexts based at least in part on one or more user interactions with an online purchasing system;

determine a plurality of facets associated with a first product of the online purchasing system;

determine a first ranked list of substitute products associated with the first product and based at least in part on the one or more intent contexts;

determine a ranked list of facets associated with the first product, wherein the ranked list of facets at least partially overlaps with the plurality of facets associated with the first product;

merge the first ranked list of substitute products and the ranked list of facets to determine a second ranked list of substitute products comprising at least a portion of the first ranked list of substitute products; and cause presentation of a first facet-based context-aware user interface that includes the second ranked list of substitute products, wherein a first substitute product of the second ranked list is associated with a first set of facets and a second substitute product of the second ranked list is associated with a second set of facets different from the first set of facets, wherein the presentation of the first substitute product within the second ranked list of substitute products includes a first selectable icon indicative of a first facet in the first set of facets, and a second presentation of the second substitute product within the second ranked list of substitute products includes a second selectable icon indicative of a second facet in the second set of facets.

11. The non-transitory computer-readable storage medium of claim 10, wherein the one or more intent contexts comprises:

a first intent context, based at least in part on a search query; and a second intent context, based at least in part on a refinement of the search query.

12. The non-transitory computer-readable storage medium of claim 10, wherein executable instructions cause the device to merge the first ranked list of substitute products and the ranked list of facets by at least:

determining a first ranked facet;

determining that the first substitute product matches the first ranked facet;

determining a second ranked facet; and determining that the second substitute product matches the second ranked facet.

13. The non-transitory computer-readable storage medium of claim 12, wherein the executable instructions further configure the device to:

determine a third substitute product of the first ranked list is associated with the first ranked facet; and determine that the first ranked facet is represented in the second ranked list by the first substitute product; and exclude the third substitute product from the second ranked list.

14. The non-transitory computer-readable storage medium of claim 10, wherein the plurality of facets associated with the first product are associated with a product class of the first product.

15. The non-transitory computer-readable storage medium of claim 10, wherein the executable instructions further configure the device to:

determine selection of a first facet of the first set of facets;

determine an intent context based on the selection of the first facet; and determine a third ranked list of substitute products based at least in part on the selection of the first facet, wherein the substitute products lacking the first facet are excluded from the third ranked list.

16. The non-transitory computer-readable storage medium of claim 15, wherein the executable instructions further configure the device to:

determine selection of the first substitute product of the third ranked list; and cause presentation of a second facet-based context-aware user interface for the first substitute product, wherein the second facet-based context-aware user interface comprises a fourth ranked list of substitute products, wherein the fourth ranked list is determined based at least in part on the intent context.

17. The non-transitory computer-readable storage medium of claim 10, wherein the first product is determined from a search query result provided in response to a user search query.

18. The non-transitory computer-readable storage medium of claim 10, wherein the first selectable icon is configured to cause the presentation of a third ranked list of substitute products, wherein a third substitute product of the third ranked list is associated with the first facet and a fourth substitute product of the third ranked list is associated with the first facet.

* * * * *